(12) United States Patent
Wu

(10) Patent No.: US 12,167,281 B2
(45) Date of Patent: *Dec. 10, 2024

(54) DEVICE AND METHOD OF HANDLING RADIO BEARER CONFIGURATIONS OF RADIO ACCESS TECHNOLOGIES

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,161

(22) Filed: Apr. 11, 2022

(65) Prior Publication Data
US 2022/0240130 A1    Jul. 28, 2022

Related U.S. Application Data

(62) Division of application No. 16/172,881, filed on Oct. 29, 2018, now Pat. No. 11,337,117.

(Continued)

(51) Int. Cl.
*H04W 36/00*    (2009.01)
*H04W 28/06*    (2009.01)
(Continued)

(52) U.S. Cl.
CPC ....... *H04W 36/0016* (2013.01); *H04W 28/06* (2013.01); *H04W 36/0027* (2013.01);
(Continued)

(58) Field of Classification Search
CPC . H04W 76/15; H04W 76/11; H04W 36/0033; H04W 36/0016; H04W 36/0027
See application file for complete search history.

(56) References Cited

U.S. PATENT DOCUMENTS 8,566,455 B1 * 10/2013 Zhao ................. H04W 36/0016
                                                               709/227
11,006,433 B2 * 5/2021 Xu ......................... H04W 76/10
(Continued)

FOREIGN PATENT DOCUMENTS

| CN | 102685818 A | 9/2012 |
| CN | 105103613 A | 11/2015 |
| CN | 106817696 A | 6/2017 |

OTHER PUBLICATIONS

3GPP TSG-RAN WG2 Meeting #99 bis R2-17 11505 Prague, Czech Republic, Oct. 9-13, 2017 CR-Form-v11.2 Change Request 36.331 CR 36.331 rev—Current version: 14.4.0.

(Continued)

*Primary Examiner* — Redentor Pasia
(74) *Attorney, Agent, or Firm* — Winston Hsu

(57) ABSTRACT

A first base station (BS) for handling RB configurations of radio access technologies (RATs) comprises at least one storage device; and at least one processing circuit, coupled to the at least one storage device. The at least one storage device stores, and the at least one processing circuit is configured to execute instructions of: receiving, from a second BS, a first RB configuration of a first RAT and a second RB configuration of a second RAT for a first communication device, wherein the first RB configuration and the second RB configuration are associated to a first RB; and communicating first data associated to the first RB with the first communication device according to the first RB configuration and the second RB configuration; wherein the first RB configuration comprises a first RB identity identifying the first RB, and the second RB configuration comprises the first RB identity.

18 Claims, 3 Drawing Sheets

Related U.S. Application Data

(60) Provisional application No. 62/578,512, filed on Oct. 29, 2017.

(51) Int. Cl.
| | | |
|---|---|---|
| *H04W 36/08* | (2009.01) | |
| *H04W 76/11* | (2018.01) | |
| *H04W 76/15* | (2018.01) | |
| *H04W 80/08* | (2009.01) | |

(52) U.S. Cl.
CPC ........ *H04W 36/0033* (2013.01); *H04W 76/11* (2018.02); *H04W 76/15* (2018.02); *H04W 36/08* (2013.01); *H04W 80/08* (2013.01)

(56) References Cited

U.S. PATENT DOCUMENTS

| | | | | |
|---|---|---|---|---|
| 11,076,399 | B2* | 7/2021 | Chai | H04W 28/0967 |
| 11,115,837 | B2* | 9/2021 | Yi | H04W 84/047 |
| 2008/0304450 | A1 | 12/2008 | Rexhepi | |
| 2010/0182963 | A1 | 7/2010 | Fischer | |
| 2011/0206003 | A1* | 8/2011 | Wu | H04W 36/0022 |
| | | | | 370/331 |
| 2011/0310850 | A1* | 12/2011 | Klingenbrunn | H04W 36/14 |
| | | | | 370/332 |
| 2012/0184266 | A1* | 7/2012 | Faccin | H04W 48/08 |
| | | | | 455/426.1 |
| 2013/0039287 | A1 | 2/2013 | Rayavarapu | |
| 2013/0308578 | A1* | 11/2013 | Dwyer | H04W 76/27 |
| | | | | 370/329 |
| 2013/0324125 | A1* | 12/2013 | Bachmann | H04W 36/14 |
| | | | | 455/436 |
| 2014/0112155 | A1 | 4/2014 | Lindoff | |
| 2015/0109927 | A1 | 4/2015 | Ozturk | |
| 2015/0181470 | A1* | 6/2015 | Chai | H04W 36/18 |
| | | | | 455/438 |
| 2015/0188681 | A1* | 7/2015 | Li | H04L 5/0032 |
| | | | | 370/252 |
| 2015/0215826 | A1* | 7/2015 | Yamada | H04W 36/0072 |
| | | | | 455/436 |
| 2016/0135095 | A1* | 5/2016 | Wu | H04W 36/0027 |
| | | | | 370/328 |
| 2016/0212753 | A1* | 7/2016 | Wu | H04W 76/15 |
| 2016/0309394 | A1 | 10/2016 | Pelletier | |
| 2018/0124642 | A1 | 5/2018 | Phuyal | |
| 2018/0270791 | A1 | 9/2018 | Park | |
| 2018/0332639 | A1* | 11/2018 | Futaki | H04W 74/006 |
| 2018/0367288 | A1 | 12/2018 | Vrzic | |
| 2019/0058997 | A1* | 2/2019 | Futaki | H04W 36/26 |
| 2019/0124572 | A1 | 4/2019 | Park | |
| 2019/0191348 | A1* | 6/2019 | Futaki | H04W 36/0033 |
| 2019/0289489 | A1 | 9/2019 | Yi | |
| 2020/0015130 | A1* | 1/2020 | Wang | H04W 36/0016 |

OTHER PUBLICATIONS

3GPP TSG-RAN WG2 #99bis Tdoc R2-1711967 Prague, Czech Republic, Oct. 9-13, 2017 Agenda Item: 10.4.1.3.1 Source: Ericsson Title: TP for RRCConnectionReconfiguration Document for: Discussion.

Search Report mailed/issued on Dec. 10, 2018 for EP application No. 18203200.3, pp. 1-6.

Ericsson, "[NR-AH2#12][NR] RRCConnectionReconfiguration structure—Email discussion summary", 3GPP TSG-RAN WG2 #99, Tdoc R2-1708036, Aug. 21-25, 2017, Berlin, Germany, XP051317946, pp. 1-22.

ITRI, "Information carried from source node to target node during handover preparation phase", 3GPP TSG-RAN WG2 Meeting #99bis, R2-1711761, Oct. 9-13, 2017, Prague, Czech Republic, XP051343717, pp. 1-6.

3GPP TS 36.331 V14.4.0 (Sep. 2017), "3rd Generation Partnership Project; Technical Specification Group Radio Access Network; Evolved Universal Terrestrial Radio Access (E-UTRA); Radio Resource Control (RRC); Protocol specification (Release 14)", XP051337336, pp. 1-753.

Office action mailed on Aug. 27, 2019 for the Taiwan application No. 107138227, filing date Oct. 29, 2018, pp. 1-7.

Office action mailed on Mar. 16, 2020 for the China application No. 201811270641.3, filing date Oct. 29, 2018, p. 1-8.

Notice of Allowance mailed on Jan. 26, 2022 for the U.S. Appl. No. 16/172,881, filed Oct. 29, 2018, p. 1-9.

* cited by examiner

DEVICE AND METHOD OF HANDLING RADIO BEARER CONFIGURATIONS OF RADIO ACCESS TECHNOLOGIES

CROSS REFERENCE TO RELATED APPLICATIONS

This application is a division of U.S. application Ser. No. 16/172,881, filed on Oct. 29, 2018, which claims the benefit of U.S. Provisional Application No. 62/578,512, filed on Oct. 29, 2017. The contents of these applications are incorporated herein by reference.

BACKGROUND OF THE INVENTION

1. Field of the Invention

The present invention relates to a device and a method used in a wireless communication system, and more particularly, to a device and a method of handling radio bearer configurations of radio access technologies.

2. Description of the Prior Art

A new radio (NR) system, initiated by the third generation partnership project (3GPP), includes a new radio interface and a new radio network architecture that provides a high data rate, a low latency, packet optimization, and an improved system capacity and an improved coverage.

SUMMARY OF THE INVENTION

The present invention therefore provides a method and related communication device for handling radio bearer (RB) configurations of radio access technologies (RATs) to solve the abovementioned problem.

A first base station (BS) for handling RB configurations of RATs comprises at least one storage device; and at least one processing circuit, coupled to the at least one storage device. The at least one storage device stores, and the at least one processing circuit is configured to execute instructions of: receiving, from a second BS, a first RB configuration of a first RAT and a second RB configuration of a second RAT for a first communication device, wherein the first RB configuration and the second RB configuration are associated to a first RB; and communicating first data associated to the first RB with the first communication device according to the first RB configuration and the second RB configuration; wherein the first RB configuration comprises a first RB identity identifying the first RB, and the second RB configuration comprises the first RB identity.

A method of handling RB configurations of RATs for a first BS comprising: receiving, from a second BS, a first RB configuration of a first RAT and a second RB configuration of a second RAT for a first communication device, wherein the first RB configuration and the second RB configuration are associated to a first RB; and communicating first data associated to the first RB with the first communication device according to the first RB configuration and the second RB configuration; wherein the first RB configuration comprises a first RB identity identifying the first RB, and the second RB configuration comprises the first RB identity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
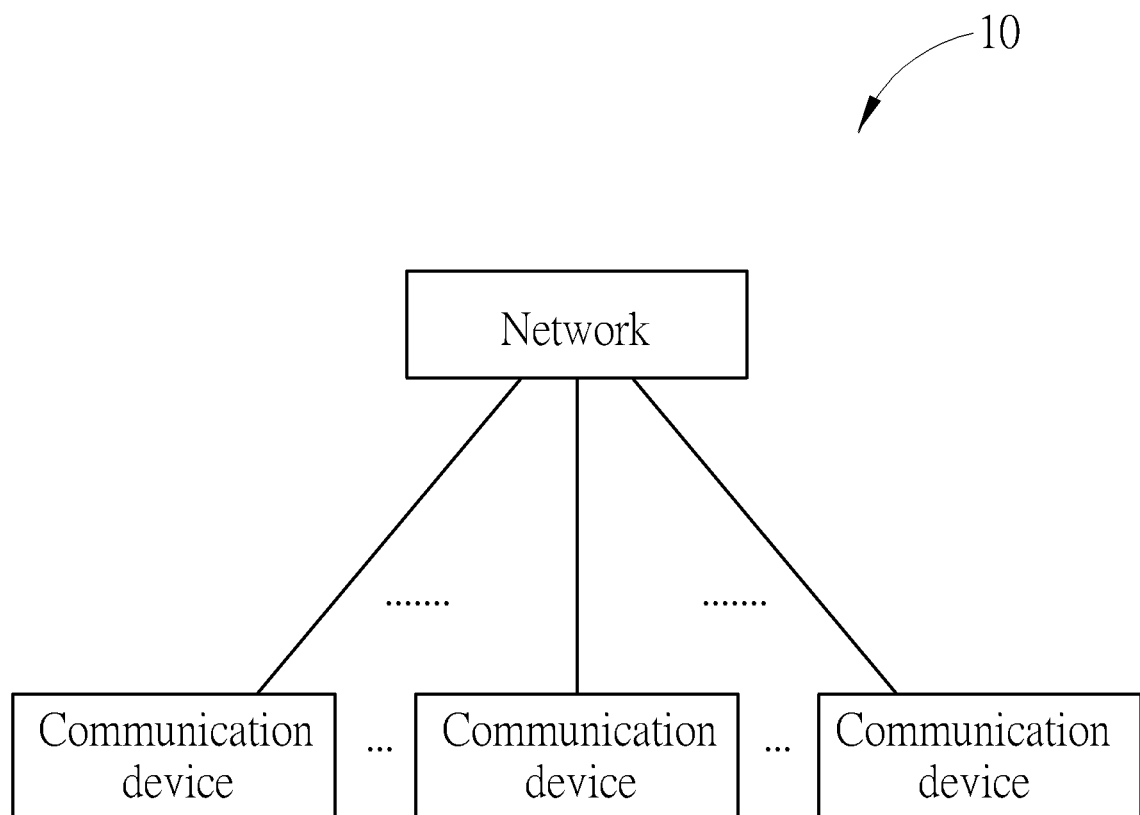
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers in the same or different duplexing modes (e.g., frequency-division duplexing (FDD), time-division duplexing (TDD) or flexible duplexing).

In FIG. 1, the network and the communication devices are simply utilized for illustrating the structure of the wireless communication system 10. The network may be an evolved Universal Terrestrial Radio Access Network (E-UTRAN) including at least one evolved long-term evolution (eLTE) evolved Node-B (eNB) or a new radio (NR) radio access network comprising at least one new radio Node-B (gNB).

A communication device may be a UE, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
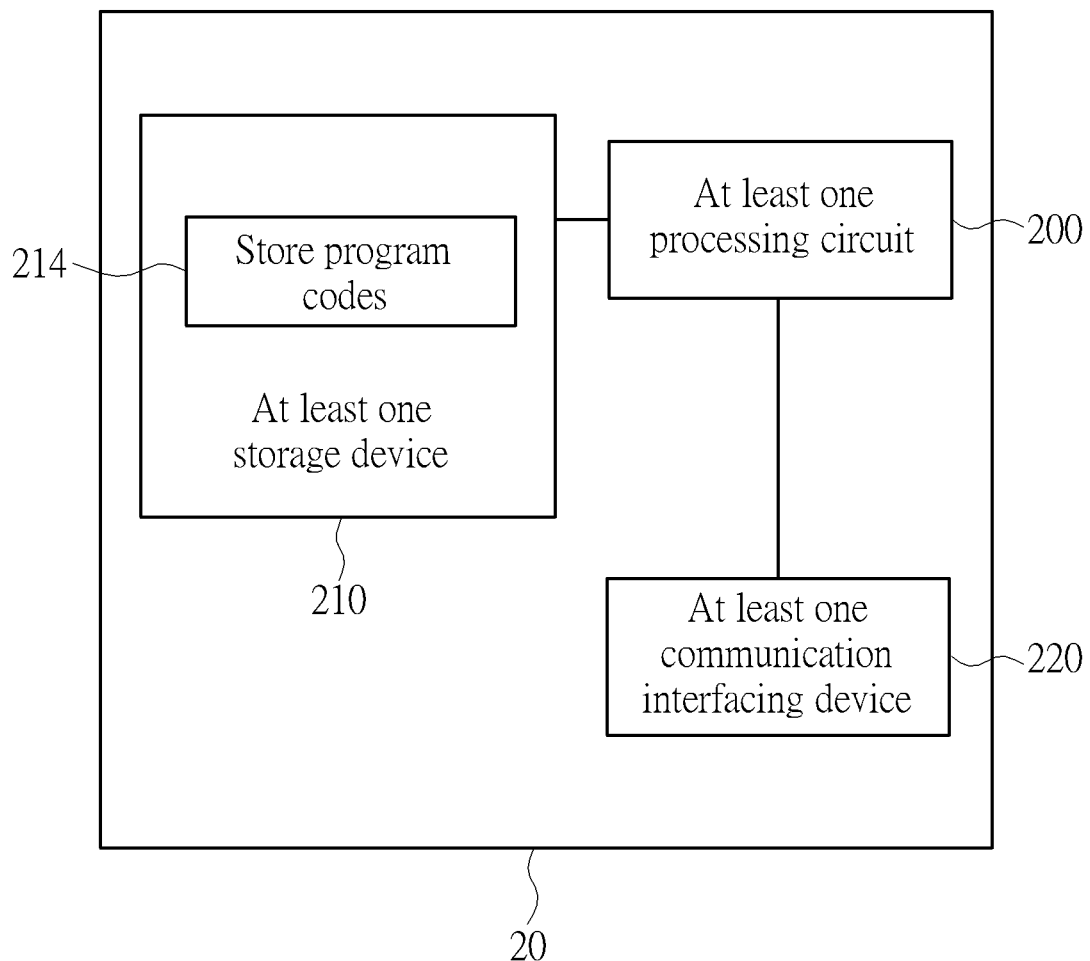
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following embodiments, a UE is used to represent a communication device in FIG. 1, to simplify the illustration of the embodiments.

Figure 3:
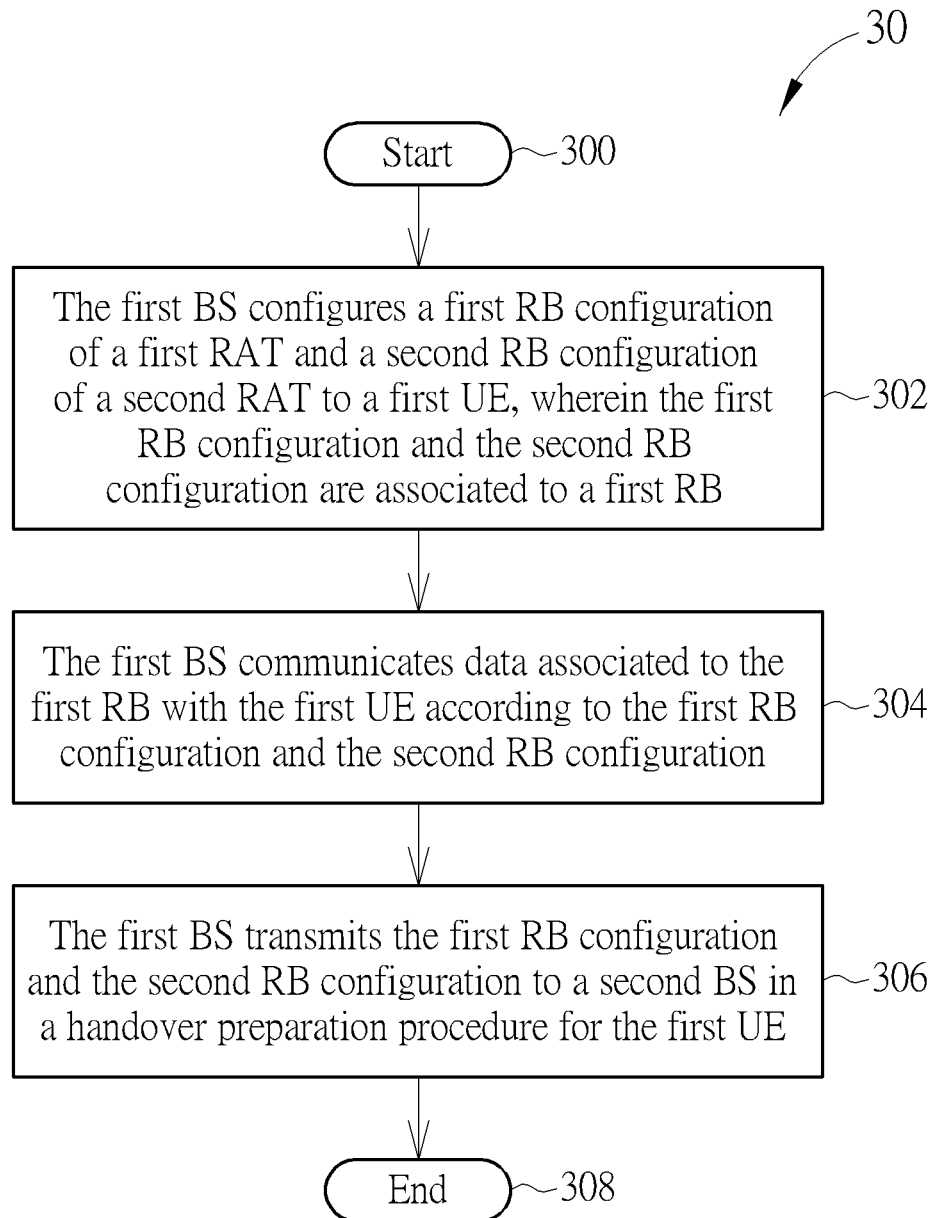
FIG. 3 is a flowchart of a process according to an example of the present invention.

A process 30 in FIG. 3 according to an example of the present invention may be utilized in a first BS (e.g. in the network in FIG. 1). The process 30 includes the following steps:

Step 300: Start.

Step 302: The first BS configures a first radio bearer (RB) configuration of a first radio access technology (RAT) and a second RB configuration of a second RAT to a first UE, wherein the first RB configuration and the second RB configuration are associated to a first RB.

Step 304: The first BS communicates data associated to the first RB with the first UE according to the first RB configuration and the second RB configuration.

Step 306: The first BS transmits the first RB configuration and the second RB configuration to a second BS in a handover preparation procedure for the first UE.

Step 308: End.

According to the process 30, the second BS communicates data associated to the first RB with the first UE according to the first RB configuration and the second RB configuration, e.g., since the first BS transmits the first RB configuration and the second RB configuration to the second BS in the handover preparation procedure.

In one example, the first BS configures the first RB to the first UE by the first RB configuration and the second RB configuration. In one example, the first RB configuration includes a first RB identity identifying the first RB, and the second RB configuration includes the first RB identity. That is, the first RB configuration and the second RB configuration include the same RB identity (i.e., the first RB identity). The first RB configuration may include the first RB identity and all or at least one of a radio link control (RLC) configuration, a logical channel configuration and a logical channel identity. The RLC configuration, the logical channel configuration and the logical channel identity are associated to the first RB. The second RB configuration may include a packet data convergence protocol (PDCP) configuration. The first/second BS communicates the data associated to the first RB with the first UE according to the PDCP configuration and the all or the at least one of the RLC configuration, the logical channel configuration and the logical channel identity.

In one example, the first RB configuration does not include a PDCP configuration. In one example, the first RB configuration also includes a PDCP configuration which is different from the PDCP configuration in the second RB configuration. When the first UE receives the PDCP configuration in the first RB configuration and the PDCP configuration in the second RB configuration, the first UE does not use the PDCP configuration in the first RB configuration. The second BS may not use the PDCP configuration in the first RB configuration.

In one example, the first BS configures the first RB configuration including the PDCP configuration and does not configure the second RB configuration, to a second UE. In one example, the first BS communicates data associated to the first RB with the second UE according to at least one of the RLC configuration, the logical channel configuration and the logical channel identity and the PDCP configuration in the first RB configuration. In one example, the first BS transmits the first RB configuration including the PDCP configuration to the second BS in a handover preparation procedure for the second UE, but does not transmit the second RB configuration in the handover preparation procedure for the second UE. In this case, the second BS may use the at least one of the RLC configuration, the logical channel configuration and the logical channel identity and the PDCP configuration in the first RB configuration to communicate data associated to the first RB with the second UE.

In one example, in the handover preparation procedure for the first UE via an interface between the first BS and the second BS (e.g., a X2 interface or a Xn interface), the first BS transmits a Handover Request message including the first RB configuration and the second RB configuration to the second BS. The second BS sends a Handover Acknowledge message including a handover command (e.g., radio resource control (RRC) Connection Reconfiguration message) in response to the Handover Request message. In the handover preparation procedure for the first UE via an interface with a network node (e.g., Si interface), the first BS transmits a Handover Request message including the first RB configuration and the second RB configuration to the network node (e.g., Mobility Management Entity (MME) or Access and Mobility Management Function (AMF)). The network node transmits the first RB configuration and the second RB configuration to the second BS. The network node transmits a Handover Acknowledge message including a handover command (e.g., RRC Connection Reconfiguration message) in response to the Handover Request message. In the above examples, the first BS transmits the handover command to the first UE. The first UE transmits a handover complete (e.g., RRC Connection Reconfiguration Complete message) to the second BS, when connecting to a cell of the second BS according to the handover command. Then, the second BS communicates the data associated to the first RB with the first UE according to the first RB configuration and the second RB configuration. The first UE may perform a random access procedure with the second BS, to transmit the handover complete message.

In one example, the second BS determines to modify the first RB configuration or the second RB configuration. If the second BS makes the determination, the second BS may include a first modified RB configuration (corresponding to the first RB configuration) or a second modified RB configuration (corresponding to the second RB configuration) in the handover command. The second BS may not modify the first RB identity, and may modify a configuration in the first RB configuration. The second BS may not modify the first RB identity, and may modify a configuration in the second RB configuration.

In one example, the first RB configuration is a data RB (DRB) configuration (e.g., DRB-ToAddMod information element (IE)) defined in a LTE RRC specification (e.g., 3GPP Technical Specification (TS) 36.331), and the second RB configuration is a DRB configuration (e.g. DRB-ToAddMod IE) defined in a NR RRC specification (e.g., 3GPP TS 38.331 or as shown in the prior art).

The following is an example of the first DRB configuration.

```
DRB-ToAddMod ::= SEQUENCE {
    eps-BearerIdentity      INTEGER (0..15)       OPTIONAL,
    drb-Identity            DRB-Identity,
    pdcp-Config             PDCP-Config           OPTIONAL,
    rlc-Config              RLC-Config            OPTIONAL,
    logicalChannelIdentity  INTEGER (3..10)       OPTIONAL,
    logicalChannelConfig    LogicalChannelConfig  OPTIONAL,          }
```

The following is an example of the second DRB configuration.

```
DRB-ToAddMod ::= SEQUENCE {
    cnAssociation           CHOICE {
        eps-BearerIdentity  INTEGER (0..15)     OPTIONAL,
        sdap-Config         SDAP-Config         OPTIONAL
    }
    drb-Identity            DRB-Identity,
    reestablishPDCP         ENUMERATED{true}    OPTIONAL,
    pdcp-Config             PDCP-Config         OPTIONAL,
}
```

In one example, the first RB configuration is a signalling RB (SRB) configuration (e.g., SRB-ToAddMod IE) defined in a LTE RRC specification (e.g., 3GPP TS 36.331), and the second RB configuration is a SRB configuration (e.g., SRB-ToAddMod IE) defined in a NR RRC specification (e.g., 3GPP TS 38.331 or as shown in the prior art).

The following is an example of the first SRB configuration.

```
SRB-ToAddMod ::= SEQUENCE {
    srb-Identity                    INTEGER (1..2),
    rlc-Config                      CHOICE {
        explicitValue               RLC-Config,
        defaultValue                NULL
    }       OPTIONAL,
    logicalChannelConfig            CHOICE {
        explicitValue               LogicalChannelConfig,
        defaultValue                NULL
    }       OPTIONAL,
}
```

The following is an example of the second SRB configuration.

```
SRB-ToAddMod ::=    SEQUENCE {
    srb-Identity        SRB-Identity,
    reestablishPDCP     ENUMERATED{true}    OPTIONAL,
    pdcp-Config         PDCP-Config         OPTIONAL,
    ...
}
```

In one example, the first BS configures a third RB configuration of the first RAT and a fourth RB configuration of the second RAT to the first UE, wherein the third RB configuration and the fourth RB configuration are associated to a second RB. That is, the first BS configures the second RB to the first UE by the third RB configuration and the fourth RB configuration. The first BS communicates data associated to the second RB with the first UE according to the third RB configuration and the fourth RB configuration. The first BS transmits the third RB configuration and the fourth RB configuration to the second BS, e.g., via the interface between the first BS and the second BS or via the interface with the network node in the handover preparation procedure. The second BS communicates data associated to the second RB with the first UE according to the third RB configuration and the fourth RB configuration. The examples described above for the first RB configuration and the second RB configuration may be applied to the third RB configuration and the fourth RB configuration, respectively, and are not narrated herein.

In one example, the first RB or the second RB is a SRB or a DRB. The first RAT may be LTE or eLTE (LTE or eLTE may be called evolved universal terrestrial radio access (E-UTRA)), and the second RAT may be new radio (NR). The first BS and the second BS may be eNBs. The data may include a plurality of protocol data units (PDUs) such as PDCP PDUs. A PDU may include a RRC message, when the first RB or the second RB is a SRB. A PDU may include a packet of an application (e.g., running in an operating system, e.g., Android, iOS, Windows, Linux, Chrome OS) or an Internet Protocol (IP) packet, when the first RB or the second RB is a DRB.

In one example, the first RB is a DRB, and the second RB is SRB. In one example, the first RB configuration is a first DRB configuration, and the second RB configuration is a second DRB configuration. In one example, the third RB configuration is a third SRB configuration, and the fourth RB configuration is a fourth SRB configuration. The following is an example of the first DRB configuration (e.g., the DRB-ToAddMod IE in the 3GPP TS 36.331) in a DRB-ToAddModList and the third SRB configuration (e.g., the SRB-ToAddMod IE in the 3GPP TS 36.331) in a SRB-ToAddModList. The DRB-ToAddModList and the SRB-ToAddModList are included in a RadioResourceConfigDedicated of the first RAT. The first BS may transmit the RadioResourceConfigDedicated to the second BS in the handover preparation procedure, e.g. in the Handover Request message described above.

```
RadioResourceConfigDedicated ::= SEQUENCE {
    srb-ToAddModList        SRB-ToAddModList        OPTIONAL,
    drb-ToAddModList        DRB-ToAddModList        OPTIONAL,
    drb-ToReleaseList       DRB-ToReleaseList       OPTIONAL,
    mac-MainConfig          CHOICE {
        explicitValue                               MAC-MainConfig,
        defaultValue                                NULL
    } OPTIONAL,
    sps-Config          SPS-Config                  OPTIONAL,
    physicalConfigDedicated     PhysicalConfigDedicated
    OPTIONAL,
    ...
}
```

In one example, the following is an example of the second DRB configuration (e.g., the DRB-ToAddMod IE in the 3GPP TS 38.331) in a DRB-ToAddModList and the fourth SRB configuration (e.g., the SRB-ToAddMod IE in the 3GPP TS 38.331) in a SRB-ToAddModList included in a RadioBearerConfig of the second RAT. The first BS may transmit the RadioBearerConfig to the second BS in the handover preparation procedure, e.g., in the Handover Request message described above.

```
RadioBearerConfig ::= SEQUENCE {
    srb-ToAddModList      SRB-ToAddModList    OPTIONAL,
    srb-ToReleaseList     INTEGER (3)         OPTIONAL,
    drb-ToAddModList      DRB-ToAddModList    OPTIONAL,
    drb-ToReleaseList     DRB-ToReleaseList   OPTIONAL,
    securityConfig        SecurityConfig      OPTIONAL
}
```

In one example, "OPTIONAL" above means that an information element (IE) may or may not exist in the first DRB configuration and/or the second DRB configuration. For example, the first BS may not include a srb-ToReleaseList or a drb-ToReleaseList in a RadioResourceConfigDedicated. If the srb-ToReleaseList (or the drb-ToReleaseList) is included, the second BS may ignore/discard the srb-ToReleaseList (or the drb-ToReleaseList). For example, the first BS may not include the srb-ToReleaseList or the drb-ToReleaseList in the RadioBearerConfig. If the srb-ToReleaseList (or the drb-ToReleaseList) is included, the second BS may ignore/discard the srb-ToReleaseList (or the drb-ToReleaseList). The first BS may not include a securityConfig. If the securityConfig is included, the second BS may ignore/discard the securityConfig.

In one example, if the first BS does not transmit the second RB configuration and/or the fourth RB configuration together with the first RB configuration and/or the third RB configuration to the second BS in the handover preparation procedure, the second BS may not be able to communicate data associated to the first RB and/or the second RB with the first UE by using the second DRB configuration and/or the fourth DRB configuration. Thus, the present invention solves the issue in the art.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention. The first RAT may be NR and the second RAT may be LTE. The first and second BSs may be gNBs.

Those skilled in the art should readily make combinations, modifications and/or alterations on the abovementioned steps, description and examples. Some steps described above may not necessarily have to be used in the invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process involving the first BS and/or the second BS, steps performed by the first BS may be compiled into the program codes 214 of the first BS and steps performed by the second BS may be compiled into the program codes 214 of the second BS.

To sum up, the present invention provides a method and related communication device for handling RB configurations of RATs. According to the present invention, a second BS (e.g., a target BS) knows how to communicate data with a UE, after receiving the RB configurations configured to the UE from a first BS (e.g., a source BS).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling radio bearer (RB) configurations of radio access technologies (RATs), comprising:
   at least one storage device; and
   at least one processing circuit, coupled to the at least one storage device, wherein the at least one storage device stores, and the at least one processing circuit is configured to execute instructions of:
   receiving, from a second BS, a first RB configuration of a first RAT and a second RB configuration of a second RAT for a first communication device, wherein the first RB configuration and the second RB configuration are configured for a first RB; and
   communicating first data associated to the first RB with the first communication device according to the first RB configuration and the second RB configuration;
   wherein the first RB configuration comprises a first RB identity identifying the first RB, and the second RB configuration comprises the first RB identity.

2. The first BS of claim 1, wherein the first RB configuration comprises at least one of a radio link control (RLC) configuration, a logical channel configuration and a logical channel identity associated to the first RB.

3. The first BS of claim 1, wherein the instructions further comprise:
   receiving, from the second BS, a Handover Request message comprising the first RB configuration and the second RB configuration to the second BS in a first handover preparation procedure.

4. The first BS of claim 1, wherein the instructions further comprise:
   receiving, from the second BS, the first RB configuration, and not receiving, from the second BS, the second RB configuration, in a second handover preparation procedure for a second communication device.

5. The first BS of claim 1, wherein the first RB configuration comprises a first PDCP configuration and a RLC configuration and the second RB configuration comprises a second PDCP configuration and does not comprise a RLC configuration.

6. The first BS of claim 1, wherein the first RB configuration comprises a first PDCP configuration and a logical channel configuration and the second RB configuration comprises a second PDCP configuration and does not comprise a logical channel configuration.

7. The first BS of claim 1, wherein the first RB configuration comprises a first PDCP configuration and a logical channel identity and the second RB configuration comprises a second PDCP configuration and does not comprise a logical channel identity.

8. A method of handling radio bearer (RB) configurations of radio access technologies (RATs) for a first base station (BS), the method comprising:
   receiving, from a second BS, a first RB configuration of a first RAT and a second RB configuration of a second RAT for a first communication device, wherein the first RB configuration and the second RB configuration are configured for a first RB; and
   communicating first data associated to the first RB with the first communication device according to the first RB configuration and the second RB configuration;

wherein the first RB configuration comprises a first RB identity identifying the first RB, and the second RB configuration comprises the first RB identity.

9. The method of claim 8, wherein the first RB configuration comprises at least one of a radio link control (RLC) configuration, a logical channel configuration and a logical channel identity associated to the first RB.

10. The method of claim 8, further comprising:
receiving, from the second BS, a Handover Request message comprising the first RB configuration and the second RB configuration to the second BS in a first handover preparation procedure.

11. The method of claim 8, further comprising:
receiving, from the second BS, the first RB configuration, and not receiving, from the second BS, the second RB configuration, in a second handover preparation procedure for a second communication device.

12. The method of claim 8, wherein the first RB configuration comprises a first PDCP configuration and a RLC configuration and the second RB configuration comprises a second PDCP configuration and does not comprise a RLC configuration.

13. The method of claim 8, wherein the first RB configuration comprises a first PDCP configuration and a logical channel configuration and the second RB configuration comprises a second PDCP configuration and does not comprise a logical channel configuration.

14. The method of claim 8, wherein the first RB configuration comprises a first PDCP configuration and a logical channel identity and the second RB configuration comprises a second PDCP configuration and does not comprise a logical channel identity.

15. A first base station (BS) for handling radio bearer (RB) configurations of radio access technologies (RATs), comprising:
at least one storage device; and
at least one processing circuit, coupled to the at least one storage device, wherein the at least one storage device stores, and the at least one processing circuit is configured to execute instructions of:
receiving, from a second BS, a first RB configuration of a first RAT and a second RB configuration of a second RAT for a first communication device, wherein the first RB configuration and the second RB configuration are configured for a first RB; and
communicating first data associated to the first RB with the first communication device according to the first RB configuration and the second RB configuration;
wherein the first RB configuration comprises a first RB identity identifying the first RB, and the second RB configuration comprises the first RB identity;
wherein the first RB configuration comprises a first PDCP configuration and the second RB configuration comprises a second PDCP configuration.

16. The first BS of claim 15, wherein the instructions further comprise:
receiving, from the second BS, a Handover Request message comprising the first RB configuration and the second RB configuration to the second BS in a first handover preparation procedure.

17. The first BS of claim 15, wherein the first RB configuration and the second RB configuration comprise a Evolved Packet System (EPS) bearer identity.

18. The first BS of claim 15, wherein the first RB configuration comprises at least one of a radio link control (RLC) configuration, a logical channel configuration and a logical channel identity and the second RB configuration does not comprise at least one of a RLC configuration, a logical channel configuration and a logical channel identity.

* * * * *